June 8, 1926.
J. P. BALDWIN
1,588,086
FITTING FOR SHOCK ABSORBERS
Filed August 17, 1925
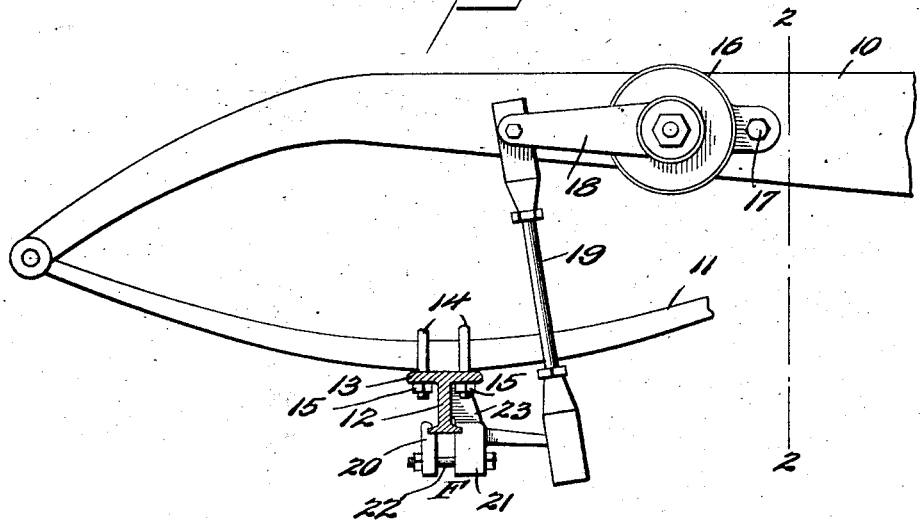
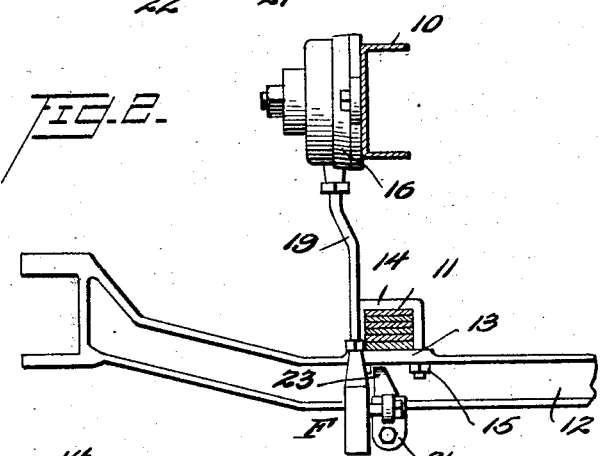
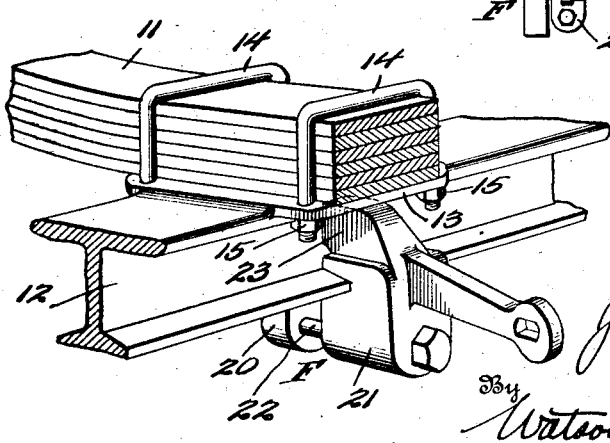
Inventor
James Pierce Baldwin
By Watson Coit Morse and Grindle
Attorneys Patented June 8, 1926.

1,588,086

UNITED STATES PATENT OFFICE.

JAMES PIERCE BALDWIN, OF LOS ANGELES, CALIFORNIA.

FITTING FOR SHOCK ABSORBERS.

Application filed August 17, 1925. Serial No. 50,768.

The present invention relates to shock absorbers, and particularly to fittings designed and constructed for the attachment of shock absorbers to motor vehicles.

In Patent No. 1,521,588, granted to me December 30, 1924, is fully disclosed and claimed a shock absorber of the friction type which is particulary adapted for use on motor vehicles. This shock absorber includes a base member adapted to be rigidly secured to the frame or chassis of a motor vehicle, a member rotatable relative to the base, friction means intermediate the base and rotatable members and connections between the rotatable member and an axle of the vehicle upon which the shock absorber is mounted. These connections include, in the case where the shock absorber is mounted at the front end of a motor vehicle, an arm rigid with the rotatable member, a coupling or fitting attached to the vehicle front axle and a connecting rod operatively connecting the movable arm of the shock absorber to the fitting.

More specifically stated, the present invention relates to the fitting by means of which the lower end of the connecting rod is attached to a vehicle axle, and the object of the invention is to provide a fitting of this character provided with means for preventing creeping or sliding movement of the fitting on the axle. It will be understood that fittings of the class which I have described briefly above are subjected to considerable stress in the ordinary operation of the shock absorber and therefore have a tendency to work loose on the axle to which they are secured, generally by clamping. In the event that such fitting becomes sufficiently loose to permit its longitudinal travel on a vehicle front axle an element of danger arises inasmuch as, if the fitting can creep outwardly thru a sufficient distance, the connecting rod may interfere with the steering mechanism of the vehicle. By means of the special fitting which I have devised all danger of this creeping on the axle is obviated and the improved fitting insures that the connecting rod will remain substantially in the position in which it is initially placed notwithstanding wear of the parts.

The invention may be developed commercially in numerous forms and it will be understood that that form which is disclosed herein is set forth by way of example only and that the invention is not limited in its scope to that embodiment illustrated in the accompanying drawings.

In the drawings:

Figure 1 is a section transverse to the front axle of a motor vehicle having a shock absorber attached, a portion of the side frame and spring being illustrated and the improved fitting being likewise shown;

Figure 2 is a section on line 2—2 of Figure 1; and

Figure 3 is an enlarged perspective view of portion of the front axle and spring, showing the attached fitting.

The side frame member of the vehicle chassis is indicated at 10, the spring at 11 and the front axle at 12. The front axle is of customary construction, being I-shaped in cross section and having enlarged upper flanged portions or spring seats 13. The spring 11 is secured to the axle by means of the usual downwardly pointed U-bolts 14 which are provided with securing nuts 15. The shock absorber base is indicated at 16, this base being secured to the side frame 10 by bolts 17, one of which is illustrated in Figure 1. The rotatable member is not illustrated in full, being almost wholly encased, and for the purpose of the present application it is sufficient to say that the arm 18 is rigidly secured to this rotatable member.

The friction devices intermediate the stationary and rotatable members are so designed that the arm 18 may swing upwardly with relative freedom but downwardly with relative difficulty in a manner well known to makers and users of shock absorbers of the friction type. The outer end of lever arm 18 is pivotally connected to the upper end of a connecting rod 19 and the lower end of this connecting rod is pivoted to a fitting indicated generally at F. This fitting includes clamping members 20 and 21 having a connecting bolt 22. The clamping members are provided with grooves or recesses to receive the lower flanges, respectively, of the axle and by means of the bolt 22 these members may be drawn together to tightly clamp the axle therebetween.

It will be seen most clearly from Figures 2 and 3 that the member 21 of the fitting is provided with an upward extension or lug 23 which lies between the two spaced ends of one of the U-bolts 14, that is, between the nuts 23 threaded on these bolts.

It is clear, therefore, that even should fitting F become slightly loosened upon the axle it connot travel outwardly a material distance inasmuch as the lug 23 will immediately come in contact with the outermost nut 15. This lug therefore constitutes a safety device holding the connecting rod 19 from interfering with the steering mechanism in the event that the fitting F becomes loosened upon its supporting axle.

It is quite obvious that the safety lock must be formed in various ways and that it may engage the inner side of the spring 11 or other part of the assembly, instead of engaging the nut 15. By providing a lug of the character shown, however, the large majority of fittings of this type may be held against creeping on the axle to which they are attached with very little additional expense.

Having thus described the invention, what is claimed as new and desired to be secured by Letters Patent is:

1. A fitting for shock absorbers comprising two members adapted to be positioned on opposite sides of an axle, means for drawing said members together and clamping the axle between them, and means on one of said members to cooperate with a projection on the axle to prevent creeping of the fitting.

2. A fitting for shock absorbers including means for clamping the same to an axle and additional means for engaging a member projecting from the axle to prevent longitudinal movement of the fitting on the axle.

3. The combination with an axle and spring, of U-bolts for securing the spring to the axle, the ends of the U-bolts lying intermediate the top and bottom of the axle, and a shock absorber fitting clamped to the axle and having a lug extending between the ends of the U-bolts, for the purpose set forth.

4. The combination with an axle and spring, of U-bolts for securing the spring to the axle, and a shock absorber fitting clamped to the axle and having a portion extending between the ends of the U-bolts, for the purpose set forth.

In testimony whereof I hereunto affix my signature.

JAMES PIERCE BALDWIN.